United States Patent [19]

Wyckoff

[11] Patent Number: 4,536,431

[45] Date of Patent: Aug. 20, 1985

[54] METHOD OF TEXTURING A SURFACE AND ARTICLES TEXTURED BY THE METHOD

[76] Inventor: Robert L. Wyckoff, 136 Oran Ct., Napa, Calif. 94558

[21] Appl. No.: 520,586

[22] Filed: Aug. 5, 1983

[51] Int. Cl.[3] ........ B32B 3/26

[52] U.S. Cl. ........ 428/162; 156/219; 156/278; 156/307.3

[58] Field of Search ........ 156/219, 278, 209, 307.3; 428/162, 161, 248, 163

[56] References Cited

U.S. PATENT DOCUMENTS 4,096,308 6/1978 Reed ........ 428/248 X 4,367,110 1/1983 Yoshikawa ........ 156/219

OTHER PUBLICATIONS

"Classic", brochure on Textile Wall Coverings Made of Fiberglass, Glass Weaving-Mill Wendland c/o De Neef America Inc., St. Louis, Michigan.

*Primary Examiner*—Evan K. Lawrence

*Attorney, Agent, or Firm*—Armand G. Guibert

[57] ABSTRACT

Conforming a layer of porous sheet material having a three-dimensionally patterned exterior surface, the material being applied directly on a smooth base member made of plastic, metal, glass, etc., and then applying a coating of a hard-enable film-forming liquid in an amount just sufficient to cover the "hills" of the patterned material and seal its pores, but not to fill the "valleys" of the material when hardened. As a result, contours of the pattern are not obscured. The desired pattern may be the inherent weave (interlaced threads) of a textile or an ornamental design embossed in a non-woven material, or the like. Penetration of the film-forming liquid through the pores and into the interface between the fabric and base member partially adheres the fabric to that member upon application of the liquid, an adherence only completed upon hardening, so that interim adjustment in positioning is provided.

25 Claims, 2 Drawing Figures

METHOD OF TEXTURING A SURFACE AND ARTICLES TEXTURED BY THE METHOD

BACKGROUND OF THE INVENTION

1. Field of the Invention

The present invention relates generally to a method providing a textured finish and to textured articles produced by this method. More particularly, the invention relates to a method for application of a textured organic film-forming system as protection and decoration not only on flat surfaces, but also on surfaces with compound curvature, such as automobile tops.

2. Description of the Prior Art

Known three-dimensional coatings include those with "random" patterns such as wrinkle finishes (produced by puckering an organic film former into a pattern of hills and valleys), "crackle" finishes (achieved by developing stress cracks in coatings) or "spatter" finishes (resulting from coarse spraying of secondary coatings onto a dry- or semi-dry-base coat).

It is also known to roll-form patterns onto planar sheets of plastic-coated materials with heat and pressure and then affix these sheets to desired surfaces by use of separate adhesives—e.g., the vinyl tops applied to automobiles. In many instances, such vinyl tops deteriorate faster than the automobile which they originally embellished, yet the remaining value and life of the automobiles do not justify the expense of replacing the vinyl coverings.

Further, it is known to apply fiberglass layers to boat hulls, automobile panels, etc., but here the objective is to provide a smooth surface—presence of the fiberglass filaments being obliterated by applied resin coatings rather than replicated by them.

Lastly, while not strictly applicable, in "arts and crafts" circles it is also known to fashion lampshades, for example, by affixing textiles to an open frame structure and then applying a clear resin to the textile to stiffen and protect it. Saturation and penetration of the textile are avoided, as these result in dripping at the inner surface. The open frame obviously gives support only at limited locations. If this is overcome by use of a temporary internal support (a balloon say), again saturation and penetration are to be avoided because adhesion ro the temporary support is undesirable and could ruin the product.

The foregoing methods are thus seen to be either expensive, or time-consuming, or not readily adapted to conformable application on non-planar surfaces having variable radius of curvature, or unpredictable as to the resulting patterns. Accordingly, there is need for a texturing method providing predictable patterns with a wide range of depth and type of texturing at low cost, little expenditure of time and without the use of separate adhesives.

SUMMARY OF THE INVENTION

The invention resides in a method of producing a textured finish on a smooth support member and an article made by the method, which method comprises the steps of conforming a porous sheet material, such as a fabric, to the support member, the fabric having an exterior surface varying in contour according to a desired three-dimensional pattern; applying a coating of hardenable liquid having adhesive properties relative to the support member, the liquid being applied at a volume rate per unit of area of support member which is sufficient for substantial saturation of the porous fabric and for sealing the pores thereof, but insufficient to build up a smooth exterior surface unaffected by the pattern of the fabric; and then allowing the liquid to harden.

Accordingly, the principal object of my invention is to provide a method of achieving a three-dimensional coating with preferably a single application of a paint or other hardenable organic liquid, which three-dimensional effect is subject to control according to a preselected pattern and/or design (if a clear finish is applied).

Another object of my invention is to provide an inexpensive method of supplying a three-dimensional quality to a coating, the quality being well controlled and giving a greater range of creativity to the artisan, who can simultaneously apply a protective coating and impart a three-dimensional texture simulating materials such as leather, parchment, linen, jute or any other material with a characteristic surface pattern.

One particular object is to permit the inexpensive and rapid restoration of appearance to an automobile having a vinyl top which has deteriorated. The method here revealed is simpler, much less expensive, more permanent and is superior to the original in that the patterned exterior surface of the coating is self-bonded directly to the steel roof substrate (primed as necessary), preventing the rust so frequently occurring under the vinyl tops of automobiles.

BRIEF DESCRIPTION OF THE DRAWING

The method of the invention and the resulting article will be detailed in reference to the accompanying drawing, in which.

DESCRIPTION OF THE PREFERRED EMBODIMENTS OF THE INVENTION

Figure 1:
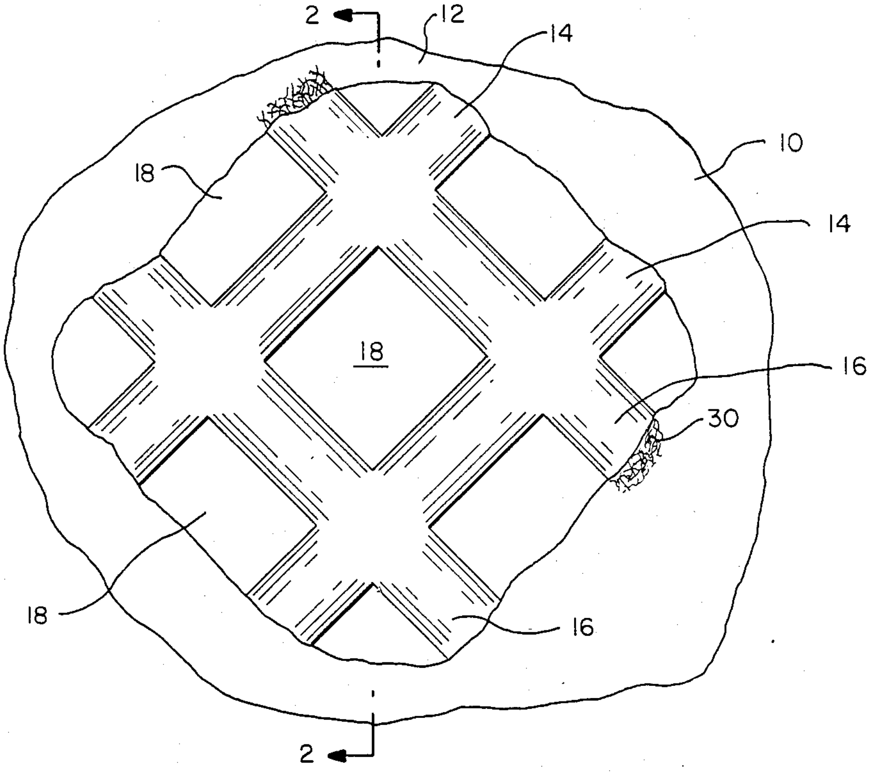
FIG. 1 is a plan view of a portion of the surface of an article made in accordance with the method of the invention, showing a diamond-lattice effect as the texture.
Figure 2:
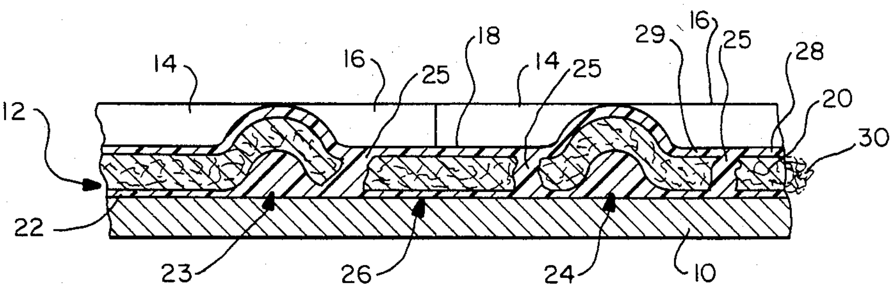
FIG. 2 is an enlarged sectional view of the article of FIG. 1 taken along the line 2—2 in the direction of the arrows.

The novel method of providing a textured finish on a substrate or support surface according to the invention can best be explained by reference to the drawing. As shown in FIG. 1, a plan view of a portion of a surface 10 having a textured finish 12, that finish 12 consists of a series of equally-spaced, linear "ridges" 14 diagonally intersecting a similar series of linear "ridges" 16 and interconnected with the latter by a diamond-shaped depression 18 formed between them. The texture shown in FIG. 1 is an example only, other textures such as simulated leather or patterned weaves, etc. being possible and described subsequently. As better seen in FIG. 2, a cross-sectional view of the composite surface 10 along section 2—2 of FIG. 1, a sheet or web 20 of porous, non-woven material (such as paper) having embossed thereon a desired patern—e.g., the diamond lattice of FIG. 1—or an intrinsic surface pattern, may be utilized according to the invention. A porous cloth with a desired weave pattern can also be utilized. The porous sheet or web 20 is laid upon surface 10 and then saturated with a film-forming liquid 22 (preferably an air-drying paint or lacquer or a two-part, catalyst-activated resin system) such that not only does film-forming liquid 22 permeate the porous patterning sheet 20, but also envelops sheet 20 within and external layer 28 which closely follows the contours of the pattern. Further, by gravity and/or capillary attraction the spaces 23,24 under ridges 14 and 16, respectively, are filled (or substantially filled) and a thin layer 26 of film-forming liquid 22 spreads under depression 18.

Once the patterning web 20 (made of paper—for example) is temporarily held in place on substrate 10 by taping, liquid 22 is brushed on (other application techniques such as spraying can be used, if desirable), penetrating the paper sheet 20 and forming a lauyer (23,24 and 26) between web 20 and substrate 10. Liquid 22 thus saturates web 20, the material of which is chosen primarily for its high porosity so that the physical qualities of the liquid-filled and coated porous web 20 and those of a plain film of liquid 22 will be virtually identical when liquid 22 is hardened. As a secondary criterion for choice, good adherence of liquid 22 to the material of patterning web 20 is preferred. Liquid 22 is applied at a rate sufficient also to form a layer 28 over web 20, which layer 28 communicates massively through the pores 25 (or other openings) with the layer (23,24,26) on substrate 10 below web 20. As a result, web 20 is totally embedded in liquid 22 and does not alter the physical properties of its surface 29 (hardness, toughness, etc.) in any material way, weather resistance being a particularly important property, of course, where exterior use is the goal—e.g., in textured car tops. By its presence then, web 20 transfers its embossed (or intrinsic) pattern to layer 28, the surface 29 of which faithfully reproduces the pattern.

Suitability of the porosity of a given material, whether a textile or a non-woven material such as paper, can be established in a simple fashion by application of a sample to glass according to the method disclosed herein, the extent of contact in the areas 23,24 and 26—a measure of adhesion to the substrate—being readily determinable because the interfacial contact area is visible from underneath.

Before discussing the examples, some additional details may be given as background to the method. First, the substrate 10 is prepared in the manner recommended by the manufacturer for application of the paint or other coating liquid 22. This may or may not include one or more known operations such as cleaning, rinsing, sanding and application of a primer coat. This last is not shown in FIG. 2, but is a conventional pre-treatment for metal substrates. The preselected porous material 20 embossed with the desired pattern or design (or with selected surface characteristics to impart a desired pattern to the finish) is fitted over the substrate, with cutting where necessary. A material which yields somewhat in both directions is preferred for patterning sheet 20 as it is then more easily conformed to compound curvatures with little cutting and fitting. The paper, or other patterning material 20, so fitted may be held in place temporarily by any of the standard adhesive tapes (not shown) available commercially, even though the solvent in most paints releases the tape. This follows because after saturation and penetration by liquid 22, the patterning sheet 20 is held down automatically, probably owing to capillary attraction of the coating material between substrate 10 and sheet 20, although the exact holding mechanism is not known to me. An alternative way of holding the patterning sheet 20—available when substrate 10 is made of steel—is to use a series of magnets at intervals to clamp sheet 20 to substrate 10. Still another way of holding the patterning sheet 20 is the "tack coat" approach described subsequently (see comment on Examples IIa,b) for less pliable fabrics.

As mentioned briefly previously, criteria for selection of liquid 22 are that it must adhere well to surface 10, that it must be compatible with the material of patterning sheet 20—i.e., must be unaffected in physical properties by the inclusion, and must not seriously affect the embossed structure of sheet 20. In respect to this last, it will be obvious that "wilting" of ridges 14,16 occurs, for instance, if sheet 20 is an embossed paper and a water-latex-base paint is selected as the film-forming liquid 22. Similarly, if an air-dying lacquer with a ketonic solvent is selected as film-forming liquid 22, then fabrics based on acrylic synthetic fibers are not suitable because the solvent may seriously degrade the texture—e.g., a pattern woven into the fabric or one embossed in the fabric.

On the whole, I have found that non-woven materials such as thin webs of single-ply tissue paper or partially fused, random-oriented polypropylene fibers or open-weave textiles (e.g., "cheesecloth") are most preferable as the patterning web 20, while two-component polyurethane or acrylic urethane resins are most preferable as the film-forming liquid 22, as will be evident from the examples discussed subsequently. Note that as used herein, the term "thin" is applied to thicknesses less than about 1/16".

An important fact to be noted from the drawings is that liquid 22 is applied at a volume rate (inclusive of all coats) such that when dry (i.e., hard), the residual layer 28 on the exterior seals the pores 25 of the patterning web 20 and coats the fibers 30 thereof, but does not completely fill the depressions 18 in the embossed pattern (or the openings—equivalent to pores 25—in a coarse maerial if an "open-weave" fabric or netting is selected). Thus, the surface 29 of layer 28 follows the contours of patterning sheet 20, contrary to the prior art practice when applying—for instance—fiberglass cloth to boat hulls, automobile bodies, or the like. When the preferred porous materials (thin, single-ply tissue or comparable non-woven materials) are used for patterning sheet 20, the volume rate of application of liquid 22 necessary to meet this goal has been found to be about 0.05 pint per square foot (0.25 liter/$m^2$) of area of the substrate being treated. In contrast, an amount of liquid 22 two to five times as great has been found necessary when the material selected for patterning sheet 20 is a textile material, the higher factor being for a coarse textile such as burlap, because of the necessity for several extra coats of liquid 22 as will be described subsequently. The extra coats are not a problem, obviously, if the cost of the particular liquid 22 is relatively low and the added labor and materials still allow competitiveness with a single application of a much more expensive liquid 22. Nonetheless, application of a single coat of liquid 22 is preferred, other things being equal, and is exemplified in Examples I–III.

EXAMPLE I

Substrate 10: Cylindrical steel can of the food-packing type, having circumferential reinforcing grooves at intervals along its axial dimension.

Patterning Sheet 20: A swatch of embossed absorbent paper toweling of the type commonly used in household kitchens—"Hi-Dri" TM made by Kimberley-Clark Corporation, Neenah, WI 54956. Embossing consists of an array of staggered, roughly squarish pimples about 39 mils (1 mm) high and 118 mils (3 mm) wide.

Film-forming liquid 22: Oil-base house paint, self-leveling—"Multi-Purpose Enamel" (#3861) manufactured by Colony Paint Company, a division of Conchemco, Inc., Kansas City, KS 64127, applied by brush at a rate such that the paper toweling appeared saturated.

Comments: The paper towel kept its embossed shape, but as supplied for kitchen purposes was not quite porous enough to permit good bonding and the spaces 23,24 under the pimples (equivalent to ridges 14,16) were hard to fill, the paint running out of the pimples and not being retained as a layer 28 over the contours of sheet 20 because of pronounced leveling tendencies of the above-identified paint. Hence, the exterior surface 29 was only marginally satisfactory as to texture. Further, that surface was also relatively soft such that durability was questionable.

EXAMPLE Ia

Substrate 10 and patterning sheet 20: Same as in Example I.

Film-forming liquid 22: Automotive acrylic lacquer—"Duracryl" TM by PPG Industries, Inc., Ditzler Fleet Finishes, Troy, Mich. 48084, applied by brushing, the rate again being such that the paper toweling appeared saturated.

Comments: The lacquer did not penetrate the toweling as well as the paint of Example I did, though the layer 28 of liquid 22 covered the sheet 20 evenly yet revealed the texture well and dried quickly. Upon subsequent peeling away of the textured finish for inspection, many areas were revealed where there was little or no bonding of the sheet 20 and lacquer 22 to substrate 10. Most were small but some of these areas were large enough to result possibly in local separation.

EXAMPLE Ib

Substrate 10 and patterning sheet 20: Some as in Example I.

Film-forming liquid 22: Two-part polyurethane resin system—"Polane" TM ASA61 manufactured by Sherwin-Williams Co., Cleveland, OH 44101, applied by brushing, the rate likewise being such that the paper toweling appeared saturated.

Comments: Excellent results—the polyurethane gave the hardest coating (i.e., surface 29), the best adhesion, and best fill of spaces 23,24 and 26 obtained in any of these three examples.

EXAMPLE II

Substrate 10: Cylindrical steel can as in Example I.

Patterning Sheet 20: Approx. 0.010"OD single strand nylon netting with hexagon-shaped holes about ⅛ inch (3.2 mm) in width.

Film-forming liquid 22: Polyurethane—Sherwin-Williams' "Polane" as in Example Ib applied by brushing, with the rate being about the same as in the foregoing examples.

Comments: The combination adhered well to the surface, but while the netting could generally be stretched and bent to follow the curved surfaces of the can, there was a definite tendency to "bridge" areas with small radius of curvature such as the grooves (about ⅛" I.D. or 3.2 mm) on the surface of the can used as substrate 10.

EXAMPLES IIa,b

Substrate 10 and patterning sheet 20: Same as Example II but the oil-base paint and the automotive lacquer of Examples I and Ia, respectively, were used as film-forming liquid 22.

Comments: These two liquids were not as satisfactory. The oil paint was too "thin" to hold the netting to the surface so, where not held in place by tape (or other clamping devices), it had to be manually held down until—or pushed down after—the paint began to harden. As an alternative to the method of the above-described example (the alternative being termed the "tack-coat" modification hereinafter described), an initial coat of the oil-base paint was applied to the substrate, allowed to become tacky, and the netting then laid down onto the tacky coating, the combination thereafter being allowed to dry almost completely. Then, a second (final) coat of the paint was applied. In both approaches, the finished surface was again relatively soft and the appearance not as sharply defined in terms of texture as compared to the finished surfaces in any of the other above examples. On the other hand, the hold-down achieved with the lacquer was quite acceptable, though the lacquer dried too quickly to permit adjustment in the netting's position, if necessary during application.

In similar experiments (not all of which are detailed herein) various other paper-base materials for patterning sheet 20 was also tested, including Kleenex TM tissues, paper towels of the absorbent brown paper shop-type, etc. Previous findings according to Examples I to IIb were consistently confirmed: the oil-base paint was more difficult to use, did not penetrate as well and resulted in a softer finished pattern (e.g., it could be removed with the thumbnail, whereas the others could not). Regarding the lacquer, as before there were instances where it did not penetrate and coalesce beneath patterning sheet 20 to provide solid anchoring to substrate 10, drying too rapidly to afford the desired total and uniform saturation of patterning sheet 20 and the areas beneath it. In contrast, the polyurethane and acrylic urethane always penetrated well, adhered strongly, dried at manageable speed and resulted in the best appearing and hardest and most durable surface.

In the course of working with the various paper materials it came as a surprise to note that (1) the thinner the paper, the better it served as a paterning sheet, allowing rapid, easy penetration and enveloping of sheet 20 by the resin and (2) even an almost filamentous layer of material would satisfactorily impart its pattern to the exterior surface 29 of the resin, whether the pattern was embossed or inherent. In particular, a single layer of Kleenex TM tissue—the two-plies of the standard Kleenex TM tissue being separated—was very adequate to impart pattern, as will now be discussed.

EXAMPLE III

Substrate 10: Cylindrical steel can as in Example I.

Patterning Sheet 20: Single-ply of Kleenex TM, a two-ply plain (no embossing, but having distinctly different texture on each side) household tissue manufactured by Kimberly-Clark Corporation, Neenah, WI 54956.

Film-forming liquid 22: Polyurethane, Sherwin-Williams' "Polane" applied by brush at a rate such that the patterning material appeared "saturated".

Comments: Even though the two-ply Kleenex TM tissue (previously tested but not detailed herein, as mentioned earlier) was separated into its consituent layers and only one of these used as the patterning sheet, the "surface texture" pattern (a fine, ripple-like surface with randomly-spaced small openings or "pores" 25 and a pronounced "grain" when edge-lighted) was not obliterated upon application of the resin, the single ply proving to be entirely adequate to impart its surface characteristics to the exterior surface 29 of the applied resin.

Use of various textiles (woven fabrics, as the term is used herein) for incorporation within the polyurethane as a patterning sheet 20 was also investigated. Because of the wide variety of textiles available in colors and patterns, which could in themselves be attractive as surface treatments, a clear polyurethane was used in some of these tests. To demonstrate that this resin technique can be used on complex curvatures and shapes as easily as or more easily than vinyl top material, an ordinary large size Coca Cola bottle with its well-known curvatures was used as the substrate as follows:

EXAMPLE IV

Substrate 10: Glass, Coca Cola TM bottle.

Patterning sheet 20: Burlap textile pre-stained a green color. Purchased from T G & Y STORES, Napa, CA, this material is the same as that from which bags of feed are made except it has been dyed. The yarns for warp and woof are coarse, irregular threads of jute or hemp, varying in diameter from about 1/32" to about 3/32" and defining roughly square holes or "pores" 25 about 1/16" on a side.

Film-forming liquid 22: Two-part resin, polyurethane IMRON (TM) Enamel, 500S Clear, a product of Dupont (see Ex.IX). Several "saturation" coats brushed on.

Comments: The burlap gave more two-way stretch than most other fabrics. It could be pulled as needed to conform it to the compound curvatures of the Coca Cola bottle. The burlap was held in position against the bottle by clothes pins and was then coated with the IMRON TM in the manner according to the invention. A particular phenomenon (also noted with respect to the heavier weights of non-woven fabric, as discussed later) was encountered—namely, the multi-strand yarns of the burlap drew up the uncured polyurethane from substate 10, concentrating it in and under the burlap yarns with the substrate (visible through the interstices of the burlap weave) getting little and sometimes no obvious coverage by the clear IMRON TM resin. This necessitated application of multiple coats (five in the above example). Even then, the surface was still highly irregular though decorative and hard (thus apparently durable). Unfortunately, some gaps between the burlap yarns ("pores 25") were still so deep and pronounced that it was obvious that dust would settle in them and might be extremely difficult to wash clean—i.e., the surface 20 would soon look dirty. Further, because the IMRON TM was drawn into and under the yarn fibers, adhesion was less complete than when using a thinner patterning sheet 20 that can more readily be "enveloped", as previously described

EXAMPLE V

Substrate 10: Glass jar.

Sheet 20: A swatch of polyester jersey textile with a floral design, also obtained at T G & Y STORES as in Example IV.

Liquid 22: Clear polyurethane of Example IV, but applied in a single coat, however.

Comments: Porosity was quite acceptable, a single application of the clear polyurethane penetrting well. Not only was the fine pattern of the weave evident, but the floral print design was clearly visible through the thin transparent layer 28 and would provide a distinctive treatment for an automobile top.

Because the two-part polyurethane finishes are relatively expensive and subject to wastage owing to limited "pot" life once mixed, other finished and textiles were investigated with the view of finding more economical combinations. Examples of these now follow.

EXAMPLE VI

Substrate 10: Cylindrical steel cans similar to those of Example I

Sheet 20: A swatch of "cheesecloth" (100% cotton), Hermitage Inc., Camden, S.C. 29020.

Liquid 22: Vinyl-Acrylic Paint—"Vinyl Fabric Coating" UK725, manufactured by Universal Protective Coatings, San Rafael, CA 94901. Applied by brushing at a rate such that sheet 20 appeared saturated. Multiple coats brushed on.

Comments: Substrate 10 was first primed with "Corroless Rust Stabilizer", an undercoating made by the same manufacturer, one coat being applied (after suitable thinning the thick, gel-like material supplied) and allowed to dry for 48 hours (drying time longer than necessary, but somewhat critical because the "hot solvents" of the paint—as termed by the manufacturer—tend to "lift" the primer with resultant wrinkling of layer 28 if dried longer than about two hours and less than 48 hours). Because of the "open" weave of the cheesecloth [the pores 25 comprising appoximately 0.050"×0.070" (1.3 mm×1.8 mm) roughly rectangular openings between interwoven threads about 0.010" (0.25 mm) in diameter], there was a probability that the threads would draw the liquid 22 out of the region of the pores 25 as previously noted in Example IV. To minimize this probability, the alternative approach mentioned earlier was adopted—namely, a light coating of liquid 22 was first applied to substrate 10, dried to a tacky condition (10–30 minutes) and then sheet or web 20 was laid over it and found to be readily manipulatable (lift for lateral positioning, cut, etc.). This was followed by three more light coats of the "Vinyl Fabric Coating". The result was excellent, the ridges 14,16 being well-defined, the valleys or depressions 18 uniformly coated, and the contours of substrate 10 followed very closely.

EXAMPLE VIa

Substrate 10: Same as in Ex. VI.

Sheet 20: Cheesecloth as in Ex. VI.

Liquid 22: (proprietary composition, aromatic solvent), Traffic Line Paint 5300P manufactured by D. J. Simpson Paint Co., So. San Francisco, CA 94080. "Saturation-type" coating brushed on.

Comments: Substrate 10 was primed as in Ex. VI, then sheet 20 laid down over same and one coat of liquid 22 applied as in the originally described method, the alternative—i.e., "tack coat"—method not being used. The result was the same as in Ex. VI except for a slight tendency of sheet 20 for bridging (though much less so than in Example II) and the "heavy-bodied" nature of this paint posing greater difficulty in manipulating the combination.

EXAMPLE VIb

Same conditions and method of application as in VIa except for a different liquid 22.

Liquid 22: Water-base vinyl paint, SEM "Topper" TM manufactured by SEM Products, Inc., Belmont, CA 94002. Applied by brushing on several coats heavier than those previously described.

Comments: The results were substantially as excellent as Ex. VI and Ex. VIa, but the vinyl paint has very little "body" so three heavy or "flooding" coats had to be applied as compared to the single "saturation" coating generally used in the previous examples. Workability of the combination was better that that in Ex. VIa, but less than in Ex. VI.

EXAMPLE VII

Same substrate 10 and patterning sheet 20 as in Ex. VI.

Liquid 22: Acrylic lacquer—Automotive Acrylic Lacquer 1001C 521B/3 manufactured by A. H. Thompson Co., Berkeley, CA 94710. Two coats applied by brushing, at a rate such that sheet 20 appeared saturated.

Comments: Texturing less satisfactory than in Ex. VI. As before in Ex. IIb, lacquer did not penetrate well through sheet 20, capillary attraction caused poor coverage of substrate 10 under pores 25, particularly in the areas of the grooves in substrate 10. Bridging at these same areas was generally evident. Use of the alternative or "tack coat" method is indicated.

For comparison purposes, the foregoing tests were repeated using the preferred polyurethanes as liquid 22:

EXAMPLE VIIa

Substrate 10: Squares of heavy aluminum foil (household type)

Sheet 20: Same as Ex. VI.

Liquid 22: Two-part resin, polyurethane—Imron TM enamel (White 1030) of E. I. Dupont de Nemours & Co., Inc., Wilmington, DE 09898. Two coats of the "saturation" type previously described were applied by "brush".

Comments: Several samples were prepared, the results being excellent except that the initial ones had the surface marred by presence of pits where air bubbles forced out of the cotton strands of the cheesecloth burst and did not level out. Air bubble formation seemed to be accentuated by use of a bristle brush with normal stroking, as against use of a plastic-foam type brush with a "dabbing" technique, such that the latter was preferred (except for the problem of solvent attack discussed subsequently). The "bubble" difficulty was remedied by pre-wetting the patterning sheet with a light coat of thinner (e.g., the Ditzler reducer more fully described in Ex. IX) in a small area—one or two inches (2.5-5 cm)—in advance of the portion of the patterning sheet about to be coated with polyurethane. Direct incorporation of the thinner in the polyurethane also solved the "bubble" difficulty.

As evident from the above examples, some textiles present a variety of problems, though still usable. The thicker the textile, the greater the number of coats required to cover the substrate 10 adequately and then to fill the interstices or pores 25 in the fabric enough so they will not soon fill with dust or mud which might be almost irremovable because of depth and roughness of pores 25. On the other hand, tightly-woven fabrics (such as a "blue jean" or a sail cloth) are equally difficult to handle because escape of air between substrate 10 and the fabric 20 is impeded, trapped air potentially resulting in an area of non-adhesion to substrate 10. Upon application of resin or other liquid 22, such tightly woven textiles have had to be rolled carefully to overcome this problem—i.e., to force out trapped air. In some cases where plural coats of liquid 22 were applied, this rolling had to be repeated after the second coat and even the third coat. No attempt was made to solve this problem by adjustment of the viscosity of the commercially available mixes through addition of reducers, even though obvious, because identification of other combinations compatible as commercially supplied was believed desirable.

The above-mentioned textiles have been applied both on glass and also on metal substrates. The exterior layers 28 retain their textile appearance though covered with the polyurethane coatings. In general, the textiles were easily cut, conformed well to the compound curvatures, but the thicker ones required more coats and, unless thin and of a medium tightness of weave, either left pits ("pores" 25) which would collect dirt and be difficult to wash clean, or else trapped air at the interface 23,24,26. Nonetheless, they give a novel and attractive finish and even the thick or tightly-woven ones may have a market despite the cost of added operations.

AUTOMOTIVE TOP RENOVATION

One of the specific objects of the invention being to provide a low-cost, simple method of replacing worn vinyl tops of automobiles, several examples of such will next be given.

EXAMPLE VIII

Substrate 10: Top area of an automobile (2-door "fastback" coupe), approximately 20 square feet.

Sheet 20: Paper napkin embossed with a "coarse pigskin" leather-like texture, designated as "Northern" TM and manufactured by American Consumer Products Div., American Can Co., Greenwich, CN 06830.

Liquid 22: Two-part Polyurethane—"Polane" ASA 61, Sherwin-Williams. Applied by brushing, in sunshine on a 65° day of 60% rel. humidity. Vol. rate=0.05 pt/ft$^2$ (based on the catalyzed mixture)—i.e., one "saturation" coat brushed on.

Comments: The deteriorated vinyl was stripped from the car top and all adhesive materail then scraped off with a putty knife. The original prime coat on the top was intact except for a few spots of rust. These last were sanded down to bare metal and the primed remainder to the top also sanded lightly to increase adhesion of the resin. After dusting off the top, one of the above-identified "pigskin" embossed napkins was placed on the middle of the top and temporarily held in place by use of a number of small magnets along the borders. Then the selected liquid 22 (polyurethane) was applied to the upper surface of the napkin with a plastic-foam type "brush" in normal painting fashion. The resin was observed to pass through the napkin and flow onto the top of the car, the permeated resin holding the napkin down. Then a second and further napkins were successively placed alongside the first and treated in like fashion with one exception. Because of the ease with which the freshly resin-saturated napkins could be moved about the surface of substrate 10, the resin had to be applied by brushing lightly toward the seam because otherwise the frictional force—though slight—was sufficient to slide the second napkin away, thus opening the seams. By such proper attention to brush stroke orientation, the seams were rendered nearly invisible. It may be noted that while the foam-type brush gave superior coating, it was rather rapidly attacked by the solvents in the Polane. Use of a natural sponge would avoid these problems.

Regarding persistence of the deformations of the paper in the presence of the resin, it may be noted that these napkins had been folded into quarters for more compact packaging. The crease at the folds could readily be flattened completely by the brushing, but the restorative force of the crease—tending to cause resumption of the folded shape—resulted in subsequent lifting of some portions of the crease, the napkin edges parallel to the crease drawing inward. Because the seams were so well lost in the pattern, only the rising of some creases revealed the patch-work approach to renovation of the top. Such creases would not normally be present in the wider, roll-form wed materials selected for commercial operations, of course.

After one month, sections of the renovated finish were removed and examined. The finish had weathered well in sun and rain. Adhesion was excellent, but while there was no evidence of any deterioration of the polyurethane due to the incorporated paper, some small rust spots had persisted because the sanding was insufficient or because moisture had penetrated in the portion of the roof supposedly sanded to "bare" metal. Obviously, the polyurethane should not be applied to a bare metal substrate. For non-experimental use of the method, the metal surface should first be prepared in accordance with the recommendations of the polyurethane manufacturer with respect to proper sealing and prior application of anti-rust/corrosion coatings, as mentioned earlier.

One problem encountered in the course of providing the textured surface of the foregoing example lay in the susceptibility to tearing of the relatively thin paper and in difficulty in obtaining neat, sharp-edged straight cuts in the seam area once the paper is saturated with polyurethane.

To resolve the foregoing problems, it was desirable to find a light, strong enbossed material (or fabric with a desired weave pattern or other surface texture) which could be cut easily even after being saturated with the polyurethane resin. I turned to polypropylene non-woven fabric, a material which apparently met the previously-listed requirements, is also much more porous than the paper napkins of Ex. IV and so thin that even overlapped seams are barely noticeable. One commercial source for a material of this type—one with the diamond lattice pattern of FIG. 1 embossed in it—is Crown Zellerbach Paper Co., San Francisco, CA 94104, which sells it under the name CELESTRA TM with a variety of weights, the lightest being designated as "C43W" (primary use as a covering material for feminine sanitary napkins), whereas the heaviest is designated "C150" (used in furniture and bedding or "C150M" disposable-medical fabric shoe covers). Intermediate weights are used as diaper covers and as other disposable-medical fabrics.

The lightest weight embossed material of this type (the C43W) is entirely adequate to transfer the diamond pattern to the exterior surfacee 29 of the coating 28 formed by the resin selected as the film-forming liquid 22 in accordance with the invention. This transfer occurs despite the fact that the C43W is so thin as to be diaphonous—printed characters being readily legible through a layer of C43W when laid on a printed page. Intermediate weights are also satisfactory in terms of appearance, but have the disadvantage that they require more resin, being slightly heavier and thicker. Inasmuch as they impart no better appearance, the requisite extra amounts of resin render them less preferred except perhaps for applications where a slightly thicker layer of resin is wanted for added corrosion protection or greater durability. The heaviest materials are of such weight that it is difficult to saturate them by a single application of liquid 22 unless this last is viscous, but in that case capillary attraction is slowed and by the time liquid 22 dries or hardens, it may not be as uniformly distributed between the patterning sheet 20 and substrate 10 as desirable for optimum adhesion.

When treated in accordance with the method of the invention, the texture of the heavier non-woven fabrics of the Celestra type produces a pronounced waffle-like appearance, the ridge areas 14,16 (FIG. 1 or FIG. 2) exerting more capillary attraction for the resin which, if of the usual low viscosity found in the commercial perparations identified, is drawn into and under the ridges 14,16 at the expense of the depressions 18 of the lattice- or waffle-like pattern, to the extent that coverage of the substrate in that area may be thin—almost to the point of transparency in some cases. A second or even a third application of resin may thus be necessary after the initial coating applied over patterning sheet 20 has partially or completely hardened (i.e., "dried" in the common terminology).

In view of the above, a light Celestra material was used in further examples of applying the method of the invention to replacement of a deteriorated vinyl car top, as follows:

EXAMPLE IX

Substrate: Half-top area of an automobile, a "notchback" 2-door coupe, comprising approximately 10.9 square feet.

Sheet 20: Polypropylene non-woven fabric—CELESTRA TM C43W (54" wide roll) made by Crown-Zellerbach (above identified).

Liquid 22: Polyurethane enamel—IMRON TM (Black, 99U) E. I. Dupont de Nemours & Co., Inc., Wilmington, DE 09898. Two coats applied by brush (volume rate of about 0.09 pt/ft$^2$ or 0.45 liter/m$^2$) on a cold day (40° F.–45° F.) in misty weather.

Comments: Texturing was excellent. The covered area was a half-roof with a lateral chrome strip over the center of the roof defining the forward limit of coverage. A window in each side panel was held in a triangular-shaped plastic frame inset in the stamped-steel, and surrounded by a ¼" (0.63 cm) gap relative to a shoulder of the side panel. A depression in the metal about 1" wide, 10" long and ½" deep (2.5×25×1.3 cm) occurred at the juncture where the roof portion met each side panel.

Treatment of the top area subsequent to the removal of the vinyl and some side padding was much the same as in Ex. VIII, except that after scraping, the car top was cleaned with lacquer thinner. The top retained its undercoating and top-coating from the factory, the surface being in fair shape though roughened by the puttyknife scraping. For filling low spots or cracks (depression at panel juncture and gap around window frame), I tried body putty ("Bondo" available from Dynatron/Bondo Corp., Atlanta, GA 30318) and found this best.

Covering gaps by bridging with a single layer of Celestra and then treating it with resin was not acceptable because of deflection inwardly but did demonstrate that if material is subsequently punctured or sheet 20 otherwise damaged, such damage can be easily repaired by just cutting a patch of Celestra to cover the area, preparing the interfacial contact area so the new coat of resin can adhere well by either lightly abrading the old surface or by lightly wiping it with a solvent to prepare for the patch. For this purpose, I have found Ditzler DAU Color Reducer DTC-504 (PPG Industries, Inc., Ditzler Automative Finishes, Troy, MI 48404) to be satisfactory (similar products of other manufacturers would be equally satisfactory). Disappointingly this combination did not weather as well for reasons not known—though a sample prepared in the same fashion but not exposed to the weather, did not deteriorate in the same half-year period. Weather-resistant grades of polypropylene are known, however. Validity of the texturing method itself was again confirmed, nonetheless.

EXAMPLE X

Substrate 10: Top area of the same automobile as in Ex. IV.

Sheet 20: Polypropylene non-woven fabric of Ex. IX (Celestra C43W).

Liquid 22: Polyurethane enamel of Ex. VIII (IMRON TM) except for color (white) difference. Applied by brush at a volume rate (two coats) of about 0.14 pt/sq.ft. (0.71/sq.meter) in sunshine on a 65° F. day.

Comments: The previous texturing of the top of the automobile of Ex. VIII was so satisfactory that the remainder of the automobile was repainted. This, however, caused the patchwork appearance of paper napkin texturing to be more noticeable, so the top was stripped and re-textured using the patterning sheet 20 of Ex. VIII and two coats of the polyurethane liquid 22 to ensure uniform coverage and durability. The results were again excellent, the lattice-like pattern of the Celestra C43W TM being clearly evident even with a second coat and the thinness of that material as patterning sheet 20 being such that the seams (overlapped areas, where necessary) were even less noticeable than previously, being visible only with strong sidelighting. Weather resistance again low.

Because of the desirable characteristics of thinness, strength and porosity provided by the polypropylene, some further combinations were tried, as follows:

EXAMPLE XI

Substrate 10: Cylindrical can similar to that of Ex. I.

Sheet 20: Same as that of Ex. X (Celestra C43W)

Liquid 22: Water-base Vinyl Paint—SEM "Topper" of Ex. VIb, manufactured by SEM Products, Inc. Applied in three "flooding" coats as in Ex. VIb.

Comments: Texturing not as satisfactory as in Ex. X, the diamond-lattice effect being less pronounced (pores 25 filled more than desired, fewer or lighter coats would have been better).

EXAMPLE XIa

Substrate 10: Same as that of Ex. XI.

Sheet 20: Same as that of Exs. X and XI.

Liquid 22: Vinyl-acrylic paint of Ex. VI (UK725 manufactured by Universal Protective Coatings). Three coats applied at a rate to give apparent saturation.

Comments: Texturing not as satisfactory as in Ex. X. Diamond-lattice effect was inferior to those of Exs. X and XI. Here, one less coat seems indicated. Tendency to wrinkle noted, possibly due to "hot solvent" action mentioned in comments re Ex. VI.

EXAMPLE XII

Substrate 10: Cylindrical steel can similar to that of Ex. I.

Sheet 20: Polypropylene non-woven fabric, a diaphonously thin [density 0.1 oz/sq.ft. (30 g/sq.meter)], non-embossed webbing having a fine feather-like texture. Material, designated as "Polyweb" TM, not quite as diaphonous as Celestra TM C43W. Manufactured by James River Paper Co., Riegel Division, Milford, NJ 08848.

Liquid 22: Acrylic lacquer, "Duracryl", manufactured by Ditzler Fleet Finishes, PPG Industries, Inc., Troy, MI 48084. Applied by brush at a rate to give apparent saturation (two coats).

Comments: The texturing results obtained with this combination were excellent, the lacquer flowing readily through the material onto substrate 10 just as in Ex. VIII. The lacquer dried very quickly, thus having an added advantage beyond its lower cost relative to the two-part resins.

EXAMPLE XIIa

Same substrate 10 and sheet 22 as in Ex. XII.

Liquid 22: Acrylic lacquer of Ex. VII, manufactured by the A. H. Thompson Co. and applied at a rate to give apparent saturation (two coats).

Comments: Texturing results similar to those in Ex. XII—i.e., quality excellent, quick-drying.

EXAMPLE XIIb

Same substrate 10 and sheet 20 as in Exs. XII, XIIa.

Liquid 22: Vinyl-acrylic paint of Ex. VI (UK 725 manufactured by Universal Protective Coatings). Three coatings applied at a rate to give apparent saturation.

Comments: Texturing of about the same quality as in Exs. XII, XIIa except for a tendency to wrinkle.

EXAMPLE XIIc

Same substrate 10 and sheet 22 as in Exs. XII–XIIb.

Liquid 22: Water-base vinyl paint of Ex. VIb—i.e., SEM "Topper" TM.

Comments: Texturing quality better than XIIb (no wrinkling), being quite similar to that of Exs. XII and XIIa.

The above description of a method of texturing a surface and articles textured by the method comprises conforming a porous fabric sheet or web (20) to a support member (10), the web (20) having a desired three-dimensional pattern (14,16,18) on it; then applying a coating of a hardenable liquid (22) which adheres well to the support member, the liquid being applied at a volume rate per unit area of the support member sufficient for saturating the web, sealing its pores (25), and penetrating through the web into contact with the support member (10); but insufficient to provide a smooth, level surface obliterating the pattern; and, finally, allowing the liquid to harden such that on the finished article, the contours of the pattern (14,16,18) are replicated as a hard coating 28 adhering well to the support member (10).

While specific embodiments of the inventive method have been disclosed, those skilled in the art will readily envision further modification and improvement based on this description. In particular, other two-part resin systems (e.g., polyesters) could be employed in some applications. Further, while the examples are based on the use of film-forming materials as supplied by the manufacturer, it is clear, for example, that use of reducers to lower the film-forming material's viscosity so as to improve penetration of a fabric having a desired pattern, but being of marginal porosity, would be a modification intended to be within the range of the claims. Accordingly, the invention is not to be limited to the description, but is to be defined solely by the claims and any improvements and modifications falling within the scope of the claims are intended to be included within the invention.

What is claimed is:

1. Method of producing a textured finish on a given area of a smooth support member, comprising the steps of:

(a) conforming a porous sheet material (20) to said area of the support member, said porous sheet material having an exterior surface with contours according to a desired three-dimensional pattern;

(b) applying a coating of a hardenable liquid (22) having adhesive properties relative to said support member, said liquid being applied to said porous sheet material at a volume rate per unit of said area sufficient for substantial saturation of said porous sheet material and penetration therethrough to said support member for sealing the pores of said sheet material but insufficient to provide a smooth exterior surface unaffected by said pattern of the material; and (c) hardening said liquid to form a hard coating on said exterior surface replicating said contours of the material, said hardened liquid being the sole means adhering the material to said support member.

2. The method defined in claim 1 where said hardenable liquid is applied by brushing.

3. The method defined in claim 1 wherein hardening said liquid comprises air-drying thereof.

4. The method defined in claim 3, including, as steps preliminary to step (a), the steps of (1) applying an initial coating of said liquid to the support member, and (2) air-drying said initial coating to a tacky state.

5. The method defined in claim 1, wherein said porous sheet material is a paper web having said desired pattern embossed thereon.

6. The method defined in claim 5, wherein said paper web is a thin tissue.

7. The method defined in claim 1, wherein said porous sheet material is a diaphanously thin web of partially-fused, random-oriented, non-woven polypropylene fibers.

8. The method defined in claim 1, wherein said hardenable liquid is a two-part polymeric resin system comprising a resin monomer and a catalytic agent and said step of hardening said liquid includes addition of said catalytic agent to said monomer prior to said step of applying a coating of the liquid.

9. The method defined in claim 8, wherein said polymeric resin system comprises a polyurethane.

10. The method defined in claim 8, wherein said polymeric resin system comprises an acrylic urethane.

11. The method defined in claim 8 wherein said porous sheet material is a sheet of single-ply tissue paper.

12. The method defined in claim 8, wherein said porous sheet material is a paper web having said desired pattern embossed thereon.

13. The method defined in claim 8, wherein said porous sheet material is a diaphanously thin web of partially-fused, random-oriented, non-woven polypropylene fibers.

14. The method defined in claim 13 wherein said desired pattern is embossed on said web.

15. The method defined in claim 8, wherein said porous sheet material is a textile material.

16. The method defined in claim 15, wherein said hard coating is clear.

17. The method defined in claim 16, wherein said desired pattern comprises a vari-colored design.

18. The method defined in claim 1, wherein said porous sheet material is a textile.

19. The method defined in claim 18, wherein said hard coating is clear.

20. The method defined in claim 19, wherein said desired pattern comprises a vari-colored design.

21. The method defined in claim 18, wherein said liquid is a two-part polymeric resin system comprising a resin monomer and a catalytic agent, and said step of hardening said liquid includes comprises addition of said catalytic agent to said monomer prior to said step of applying a coating of the liquid.

22. The method defined in claim 1, wherein said porous sheet material is a sheet of single-ply tissue paper.

23. The method defined in claim 1, including as steps preliminary to step (a), the steps of (1) applying to said area an initial coating of said liquid, and (2) hardening said initial coating to a tacky state.

24. An article textured by the method of claim 1, said article consisting of:

(a) a smooth surface to be textured, (b) a single, thin layer of sheet material having a particular texture and including a plurality of pores, said sheet material overlying said surface with an interior side of said layer adjacent thereto and an exterior side spaced therefrom;

(c) a hard coating having a first portion in direct, adherent relation to said surface, a second portion adjacent said exterior side and enveloping said sheet material in fashion replicating said particular texture, and a third portion penetrating said pores and linking said first and second portions.

25. The article defined in claim 24, wherein said surface to be textured is an automobile top.

* * * * *